Jan. 5, 1937.  L. L. WADSWORTH  2,066,592
METHOD OF LINING PIPES
Filed Oct. 23, 1935
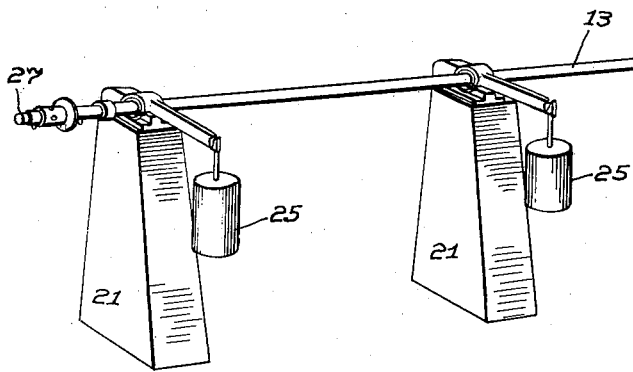
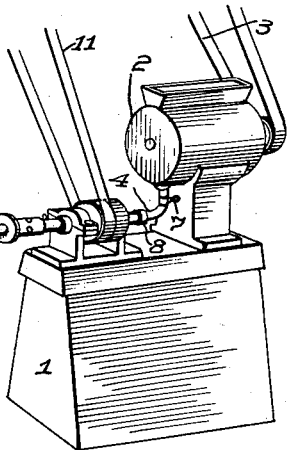
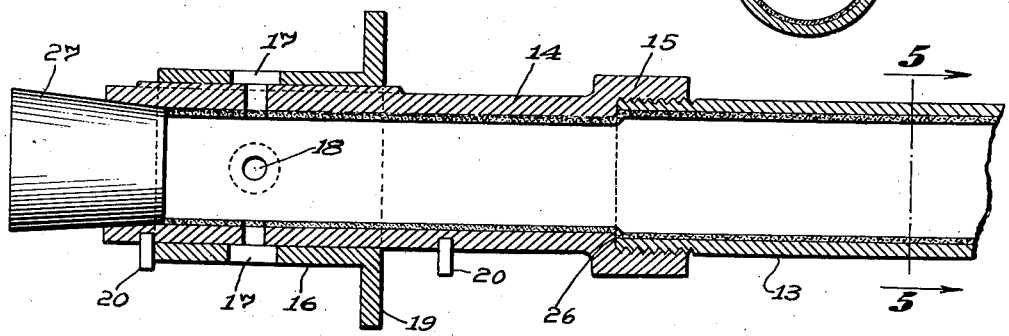
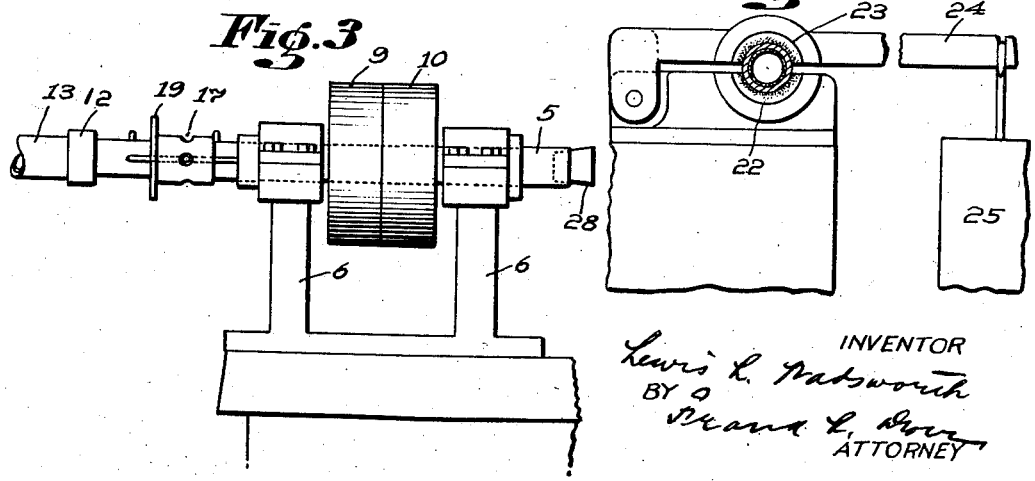
INVENTOR
Lewis L. Wadsworth
BY
Frank L. Dorr
ATTORNEY Patented Jan. 5, 1937

2,066,592

UNITED STATES PATENT OFFICE 2,066,592

METHOD OF LINING PIPES

Lewis L. Wadsworth, Winchester, Mass.

Application October 23, 1935, Serial No. 46,333

3 Claims. (Cl. 91—68)

My invention relates to new and useful improvements in a method of lining pipes with a thin protective and coherent inner coating. The invention is adapted for lining pipes preferably with Portland cement either neat or mixed with fine sand to constitute a cement mortar. The invention, however, is not limited to such use and may be employed for lining pipes with numerous other materials, such as bituminous compounds, resins, or sulphur, either alone or mixed with fine sand or similar ingredient.

When the method is carried out in connection with the lining of pipes with cement or cement mortar the operations may be performed under normal atmospheric temperature but when the apparatus is employed for lining pipes with materials of the nature of bituminous compounds heat may be required to make the materials sufficiently fluid as to be worked under practical conditions.

My invention is especially adapted for use in lining pipes of relatively small inside diameter, say from one-quarter inch up to four inches. Although the invention can be utilized for lining pipes of relatively large size it is not so desirable for this purpose, owing to the great weight involved and also because large sized pipes can be satisfactorily coated by operations carried on from the outside.

By the carrying out of my invention I am able to quickly and efficiently and cheaply apply to the inside of a pipe, even of small diameter, a thin, uniform and coherent coating to resist deterioration as now occurs with unlined underground water pipes or for use in chemical factories or industrial plants or in any other field in which an unlined and unprotected pipe is subjected to mechanical or chemical deterioration.

In carrying my invention into effect I utilize centrifugal force for distributing the lining material uniformly upon the interior of the pipe, which force also serves to tightly compact the lining material in place so as to form a strong and coherent coating.

In lining pipes with cement, cement mortar or analogous materials to which my improved method is particularly directed, I utilize the centrifugal effect to force the suspended solid particles from a body of water in which they are contained and to cause these particles to build up on the inside wall of the pipe as a uniform and coherent coating of any desired thickness. Preferably I also utilize the centrifugal force to drive out the water after the solid particles have been compacted to form the desired lining as will be hereafter explained. Thus, by driving out the water by centrifugal force, much excess water is removed that is not required for the chemical hydration of the cement and as a result the period of drying is somewhat curtailed.

In brief, the general objects of my invention are to provide an improved method by which pipes, even of small diameter, may be lined with a suitable coating of any desired thickness and uniform and compact in nature.

In order that the invention may be better understood attention is directed to the accompanying drawing, forming a part of this specification and in which Figure 1 is a perspective view showing the apparatus in simplified form.

Figure 2 a sectional view of a portion of a pipe and the bleeding coupling at the outer end thereof illustrating the discharge valve or ports open to permit flow of water from the interior.

Figure 3 is a detail elevation showing a part of the driving head of the apparatus.

Figure 4 a detail showing one of the bearings, and

Figure 5 a cross sectional view on the line 5—5 of Figure 2.

In the above views corresponding parts are indicated by the same characters of reference.

Upon a heavy concrete foundation 1, I mount a mixing machine 2 of any well known type by means of which an intimate mixture may be secured of cement or cement and sand or other equivalent material, with a very large excess of water, and this intimate mixture will be maintained up to the time it is drawn off, as will be later explained. The mixer may be driven from any source of power, such as by the belt 3. A draw off pipe 4 permits the water, with a small percentage of solids intimately mixed therewith, to enter a head 5 mounted in bearing 6—6 on the support 1. This flow out of the mixer is controlled by the usual valve 7. The pipe 4 is preferably a flexible pipe permitting it to be disconnected from the rotating head 5 and the coupling 8 between the pipe 4 and head 5 is of a character which will permit the head to be slowly rotated during filling. The head 5 is shown as being provided with fast and loose pulleys 9 and 10, respectively, by which it may be rotated or stopped when desired, and the fast pulley 9 is driven by belt 11 from an electric motor or other source of power by which the speed may be controlled, as will be hereinafter explained.

The head 5 is formed with a threaded socket 12 into which is screwed one end of the pipe 13 which is to be lined.

At the other end of the pipe 13 is a sleeve 14 having a threaded socket 15 into which that end of the pipe to be lined is screwed.

Both the head 5 and sleeve 14 are provided with bleeding valves permitting the expulsion of water during the operation and one of these valves is clearly shown in Figure 2. It comprises a collar 16 having holes or ports 17 therein adapted to be brought into line with holes or ports 18 in the head 5 or sleeve 14 as the case may be. When the holes 17 and 18 are in alignment water may be expelled or drained from the interior of the pipe. Each of the collars is formed with a flange 19 by which the collar may be moved as it rotates by pressing any form of implement such as a wooden stick against the same. Stops 20 limit the movement of the two collars.

Generally pipes to be lined are furnished in factory lengths of from 19 to 24 feet and therefore require to be supported at one or more points in order that they may not whip or lash at high speeds. To this end I erect one or more concrete piers 21, two being shown, carrying bearings for the pipe. These bearings are preferably so constructed as to permit the ready introduction or removal of the pipe and, therefore, they are preferably made of two parts, comprising a lower block 22 for receiving the pipe and an upper block 23 engaging the pipe and holding it in place. These upper blocks 23 are preferably carried by pivoted levers 24 and are held down by weights 25 sufficiently heavy to cause the bearings to function properly.

Obviously a bearing of this kind can be readily opened to permit the quick and easy introduction or removal of the pipe. Owing to the fact that commercial steel pipe is rough on the outside, I have found that steel bearings and bearings of Babbitt or the like are not durable, due to abrasion. A bearing that will flex and yield slightly as the semi-rough steel pipe revolves works best and I have found that sole leather lubricated with grease or semi-hard sheet gum rubber lubricated with water is eminiently satisfactory for the purpose.

It will be observed from Figure 2 that where the pipe 13 enters the threaded socket 15 a shoulder 26 is formed the purpose of which will be later explained. A similar shoulder will be formed where the other end of the pipe 13 enters the socket 12.

In describing the operation of the apparatus it will be assumed that a pipe having an interior diameter of one inch is to be lined and therefore the figures of desirable velocities hereafter referred to will be suitably modified if pipes of different diameters are under treatment.

Assuming that the pipe 13 is mounted in the bearings as described it is first slowly rotated at a velocity of say from 15 to 30 R. P. M. I find that this slow, preliminary rotation is highly important, since, if the pipe is stationary during loading, a certain amount of the cement or other solid material will settle out of the water by gravity to result in the formation of an uneven lining.

The desired material, such as cement of one or more brands or cement and sand, with a great excess of water, having been intimately mixed in the mixer 2 and the bleeder valves being closed at both ends, the valve 7 is opened, allowing the mixture to enter the pipe 13 so as to fill the same entirely full, without the formation of air bubbles or pockets therein. Rubber plugs 27, 28 are now placed at the open ends of the head 5 and sleeve 14 as shown in Figures 2 and 3. Of course, the flexible pipe 4 from the mixer will be first disconnected to permit the plug 28 to be thus used. It will be understood that during the loading of the pipe the plug 27 may be in place, in which case the valve 16 will be opened to permit the escape of air from the interior of the pipe.

In order to facilitate the loading of the pipe with the water mixture of cement or cement and sand, suction may be applied to the outer end in any suitable way, such as by connection with a vacuum tank or suction pump.

As so far described the pipe 13 and head 5 and sleeve 14 will be completely filled with a mixture of water, in excess, and cement, cement and sand or other suitable material, substantially uniformly distributed throughout the water and the slowly rotating structure as a whole will be closed by the rubber stoppers 27 and 28.

When this is done, the speed of rotation is immediately increased to a very high value so that, as a result of the centrifugal force developed, the solid particles will move or be driven out into contact with the pipe to form a coherent coating thereon of a thickness depending upon the amount of solid material used. The separation of the solid material from the water is in fact almost complete, so that the water remaining in the interior of the pipe is substantially free of solid matter. In lining a pipe of one inch inside diameter I find that good results in forming a satisfactory lining are secured with a speed of from 2500 to 3500 R. P. M. continued for a period of about two minutes.

After spinning, as explained, and while the pipe is still turning although not necessarily at the same high speed, the bleeding valves are opened by pushing a stick or other implement against the flanges 19. This permits the clear water to be drained or forced out by centrifugal force. During this draining operation the lining will be unaffected, although it will still contain sufficient water to hydrate, set and harden the cement into a compact stone-like mass. Such a lining is indicated at 29 in Figure 5.

After the lining has been formed as explained, the pipe 13 is unscrewed from the end of the rotary head 5 and the sleeve 14 is unscrewed from the other end of the pipe. By forming shoulders 26, as pointed out above, at the sockets 12 and 15, I provide a weak plane for shearing the continuous cement lining when the pipe 13 is unscrewed from the head 5 and when the sleeve 14 is unscrewed from the pipe 13. If the lining is sufficiently hard when this is done, a square cut surface will be presented at these points of shearing at the ends of the pipe.

By providing drainage by means of the rotary head 5 and sleeve 14 at both ends of the pipe to be lined, I make certain that the lining of pipe 13 will be continuous, uniform and coherent throughout. In other words, in the head 5 and sleeve 14, there is liable to be a slight impoverishment of lining material owing to the escape or leakage of free water when revolving at high speed. The drainage ends, therefore, are made of sufficient length so that any such impoverishment from this cause does not extend to the pipe to be lined.

I have found that it is not absolutely necessary to expel the water centrifugally, because it is possible, after the lining operation by centrifugal force, to remove the pipe, place it upright and simply allow the surplus water to drain off. However, there is the danger of a very slight erosion of the lining taking place an inch or so within the exit end, when draining is done in this way. Hence, I prefer to use these bleeding ends to provide for the complete lining of the pipe uniformly throughout its entire length.

It will of course be understood that after the pipe has been lined with cement or a material of that nature and the lined pipe has been removed, the lining formed within the head 5 and sleeve 14 will be scraped out before the final set takes place and when the material can be removed easily.

Instead of following the above procedure for lining the pipe with a material of a bituminous nature I prefer to fill the pipe with a dry bituminous material in particles of such coarseness that when melted they will constitute a lining of the desired thickness. After the pipe has been thus filled it is rotated rapidly and at the same time the pipe is heated in any suitable way causing the bituminous material to melt and distribute itself in liquid form upon the wall of the pipe by reason of the centrifugal effect. If this is done heat is withdrawn and if necessary the pipe may be actually chilled so as to cause the bituminous lining to congeal and set.

Having now described my invention, what I claim is new therein and desire to secure by Letters Patent is as follows:

1. The method of lining pipes with cement or the like which consists in forming an intimate mixture of such material with a large excess of water, then in introducing the mixture within the pipe so as to completely fill the same, said pipe being closed by both ends, then in rotating the pipe at high velocity whereby centrifugal force will cause the solid particles to deposit from the water and form a uniform coherent coating and finally in expelling water from the pipe by centrifugal force through radial openings in a continuation of said pipe.

2. The method of lining pipes with cement or the like which consists in forming an intimate mixture of such material with a large excess of water, then in rotating the pipe slowly, then in introducing the material within the slowly rotating pipe so as to completely fill the same, said pipe being closed at both ends, then in rotating the pipe at high velocity whereby centrifugal force will cause the solid particles to be deposited from the water to form a uniform coherent coating and finally in removing the clear water by centrifuging effect through radial openings in a continuation of said pipe.

3. The method of lining pipes with cement or the like which consists in forming an intimate mixture of such material with a large excess of water, then in introducing the mixture within the pipe so as to completely fill the same, said pipe being closed at both ends, then in rotating the pipe at high velocity whereby centrifugal force will cause the solid particles to deposit from the water and form a uniform coherent coating and finally in expelling water from the pipe radially by centrifugal force without arresting rotation thereof.

LEWIS L. WADSWORTH.